W. COX.
FARE BOX.
APPLICATION FILED JUNE 1, 1914.

1,135,263.

Patented Apr. 13, 1915.

WITNESSES
J. P. Broddy
Pal Montigny Kennedy

INVENTOR
William Cox
by Chas H Riches
Attorney

THE NORRIS PETERS CO., PHOTO-LITHO., WASHINGTON, D.

//UNITED STATES PATENT OFFICE.

WILLIAM COX, OF TORONTO, ONTARIO, CANADA.

FARE-BOX.

1,135,263.

Specification of Letters Patent.

Patented Apr. 13, 1915.

Application filed June 1, 1914. Serial No. 842,292.

*To all whom it may concern:*

Be it known that I, WILLIAM COX, of the city of Toronto, in the county of York and Province of Ontario, Dominion of Canada, have invented certain new and useful Improvements in Fare-Boxes; and I hereby declare that the following is a full, clear, and exact description of the same.

My invention relates to a fare box in which the examining chamber is provided with an oscillating trap actuated by a rack and pinion gear during the movement of the sliding cover for the fare receiving slot, as hereinafter set forth and pointed out in the claims.

Figure 1:
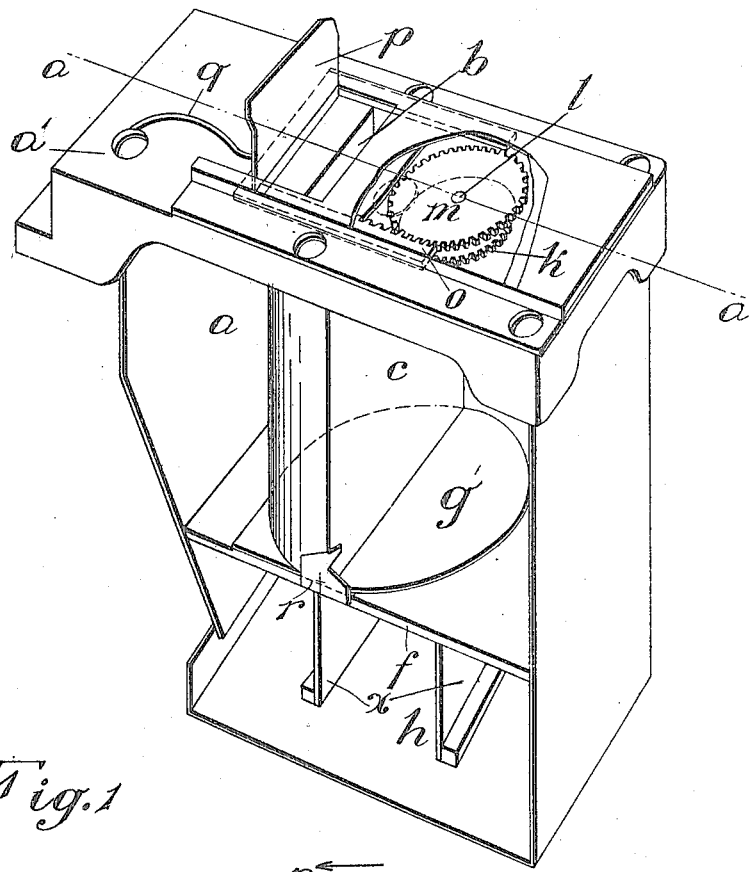
Figure 2:
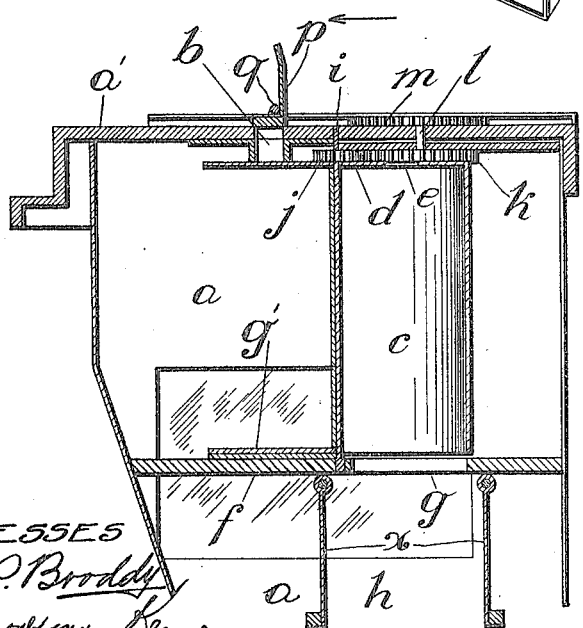

In the drawings: Figure 1, is a perspective view of the examining chamber of the fare box showing the trap and its actuating mechanism, the trap being positioned for the entry of a fare therein; and, Fig. 2, is a vertical section on the line $a$—$a$ Fig. 1, with the trap oscillated into reverse position to that shown in Fig. 1.

Like characters of reference refer to like parts throughout the specification and drawings.

The top $a'$ of the examining chamber $a$ is provided with the usual fare receiving slot $b$ through which the fares are admitted to the fare box, and journaled in the upper part of the examining chamber, preferably at one side of the fare receiving slot $b$ is a vertically disposed trap $c$ having a circular cover $d$ with a slot $e$ which, during the oscillation of the trap, registers with the fare receiving slot $b$ so that the fare inserted into the slot $b$ can pass into the trap. The cover $d$ continually closes the inner end of the fare receiving slot $b$ except when the slot $e$ comes into line with it so that the fares admitted to the fare box cannot be extracted therefrom. Below the trap $c$ is a stationary baffle $f$ with an opening $g$ through which the fares descend into the magazine $h$ when the trap is in the position shown in Fig. 2, the opening $g$ being out of line with the fare receiving slot $b$ and permanently shut off from communication therewith by the trap $c$ and cover $d$.

Fixed to the trunnion $i$ at the upper end of the trap $c$ is a pinion $j$ and meshing with the pinion $j$ is a gear wheel $k$ fixed on a stud $l$. On the stud $l$ is a gear wheel $m$ with which meshes a rack $o$, connected to a slide $p$ which closes the fare receiving slot $b$ when the trap is in the position shown in Fig. 2. The slide $p$ is pressed by a spring $q$ to normally close the fare receiving slot $b$, the closing action of this spring and slide causing the rack and pinion gear to turn the trap $c$ from the position shown in Fig. 1 to that shown in Fig. 2, the turning movement of the trap being arrested by the stop $r$.

The normal position of the parts is that shown in Fig. 2 and in this position the trap $c$ is oscillated away from and below the fare receiving slot, and the slide $p$ is positioned to cover the slot. To insert a fare into the box it is necessary to press the slide $p$ in the direction indicated by arrow in Fig. 2 and this movement of the slide carries with it the rack $o$ which, meshing with the gear wheel $m$, rotates that gear wheel a partial revolution. This rotation of the gear wheel $m$ causes a corresponding rotation of the gear wheel $k$ which meshing with the pinion $j$ causes a partial rotation of the pinion and the trap $c$, bringing the trap $c$ from the position shown in Fig. 2 to that shown in Fig. 1, in which position the slot $e$ is in line with the fare receiving slot $b$, the fare receiving slot $b$ being then uncovered by the slide $p$. When the fare is admitted and the pressure on the slide $p$ is removed, the spring $q$ presses the slide back to its normal position and the return movement of the slide actuates the rack and pinion gear to oscillate the trap $c$ and bring the slot $e$ out of line with the fare receiving slot $b$. When the trap $c$ comes into line with the opening $g$ the fares contained therein pass through the baffle $f$ into the lower part of the examining chamber.

The trap $c$ is provided with a cover $g'$ to close the opening $g$ when the trap is in the position shown in Fig. 1 so that the fares in the lower part of the examining chamber cannot pass above the baffle $f$ should the fare box be inverted when the trap is in the position shown in Fig. 1.

Pivoted to the baffle $f$ at the sides of the opening $g$ are fingers $x$ which swing across the opening and close it, when the fare box is inverted, so that the fares cannot pass from the examining chamber into the trap when the latter is in the position shown in Fig. 2.

Having thus fully described the nature of my invention, what I claim as new and desire to secure by Letters Patent, is:

1. A fare box comprising an examining chamber having a fare receiving slot and a sliding cover closing the outer end of said slot, in combination with an oscillating tubular trap mounted within the examining chamber and having a cover to close the inner end of said slot, and means actuated by the sliding cover to cause the oscillation of the trap, the cover for the trap having an opening into the trap which is brought into line with the fare receiving slot at each oscillation of the trap.

2. A fare box comprising an examining chamber having a fare receiving slot and a sliding cover closing the outer end of said slot, in combination with an oscillating tubular trap mounted within the examining chamber at one side of the fare receiving slot, and having a cover to close the inner end of said slot, the cover for the trap having an opening therethrough, a pinion fixedly connected to said trap, a rack actuated by said sliding cover, and gear wheels transmitting motion from said rack to said pinion whereby the trap is oscillated to respectively bring said opening into and out of line with the fare receiving slot.

3. A fare box comprising an examining chamber having a fare receiving slot and a sliding cover closing the outer end of said slot, in combination with an oscillating tubular trap mounted within the examining chamber at one side of the fare receiving slot, and having a cover to close the inner end of said slot, the cover for the trap having an opening therethrough, a pinion fixedly connected to said trap, a rack actuated by said sliding cover, gear wheels transmitting motion from said cover to said pinion whereby the trap is oscillated to respectively bring said opening into and out of line with the fare receiving slot, and a baffle within the examining chamber at the lower end of the trap, said baffle having an opening therethrough for the emptying of the trap.

Toronto, May 20th, 1914.

WILLIAM COX.

Witnesses:
   Chas. H. Riches,
   Par Montigny Kennedy.

Copies of this patent may be obtained for five cents each, by addressing the "Commissioner of Patents, Washington, D. C."